(12) United States Patent
Powers et al.

(10) Patent No.: US 7,021,462 B2
(45) Date of Patent: Apr. 4, 2006

(54) FASTENER CARRIER ASSEMBLY AND METHOD OF USE

(75) Inventors: Jeffrey R. Powers, Larchmont, NY (US); Paul Gaudron, Stamford, CT (US)

(73) Assignee: Powers Fasteners, Inc., New Rochelle, NY (US)

( * ) Notice: Subject to any disclaimer, the term of this patent is extended or adjusted under 35 U.S.C. 154(b) by 0 days.

(21) Appl. No.: 10/455,814

(22) Filed: Jun. 6, 2003

(65) Prior Publication Data

US 2004/0118719 A1  Jun. 24, 2004

Related U.S. Application Data

(63) Continuation-in-part of application No. 10/321,840, filed on Dec. 18, 2002, now abandoned.

(51) Int. Cl.
  *B65D 85/24* (2006.01)
(52) U.S. Cl. ............................ 206/338; 206/343
(58) Field of Classification Search ............... 206/338, 206/343–347, 820, 443; 411/442, 443, 447–449; 227/120; D8/70
  See application file for complete search history.

(56) References Cited

U.S. PATENT DOCUMENTS

| | | |
|---|---|---|
| 354,462 A | 12/1886 | Copeland |
| 2,982,595 A | 5/1961 | Rogers |
| 3,357,761 A | 12/1967 | Langas et al. |
| 3,463,304 A | 8/1969 | Gallee et al. |
| 3,802,987 A | 4/1974 | Noll |
| 3,823,818 A | 7/1974 | Shaw |
| 3,915,367 A | 10/1975 | Potucek |
| 3,927,459 A | 12/1975 | Haytayan |
| 3,944,067 A | 3/1976 | Bakoledis |
| 3,954,176 A | 5/1976 | Haytayan |
| 4,047,611 A | 9/1977 | Damratowski |
| 4,106,618 A | 8/1978 | Haytayan |
| 4,167,229 A | 9/1979 | Keusch et al. |
| 4,298,121 A | 11/1981 | Oide et al. |
| 4,383,608 A | 5/1983 | Potucek |
| 4,606,455 A | 8/1986 | Grikis et al. |
| 4,684,022 A | 8/1987 | Potucek |
| 4,718,551 A | 1/1988 | Whitledge |
| 4,881,643 A | 11/1989 | Pfister |
| 4,913,611 A | 4/1990 | Leistner |
| 4,930,630 A * | 6/1990 | Habermehl .................. 206/347 |
| 4,932,821 A | 6/1990 | Steffen et al. |
| 5,005,699 A | 4/1991 | Kawashima et al. |
| 5,069,340 A | 12/1991 | Ernst et al. |
| 5,443,345 A | 8/1995 | Gupta |
| 5,544,746 A | 8/1996 | Dohi |
| 5,713,709 A | 2/1998 | Huang |
| 5,775,514 A | 7/1998 | Lin |

(Continued)

FOREIGN PATENT DOCUMENTS

EP  893205 A1 * 1/1999

*Primary Examiner*—Mickey Yu
*Assistant Examiner*—J. Gregory Pickett
(74) *Attorney, Agent, or Firm*—Morgan, Lewis & Bockius LLP (57) ABSTRACT

A fastener carrier assembly used to secure rows of fasteners in a workpiece using a conventional driving tool. The fastener carrier assembly includes a plurality of fasteners, an upper strip and a separate lower strip. The upper strips include a plurality of interconnected, frangible collating elements. The lower strip includes sleeves that are intended to stay with the fastener after the fastener is embedded into a workpiece.

31 Claims, 8 Drawing Sheets

U.S. PATENT DOCUMENTS

| | | |
|---|---|---|
| 5,836,732 A | 11/1998 | Gupta et al. |
| D403,940 S | 1/1999 | Steinfeldt |
| 5,865,311 A | 2/1999 | Hentges et al. |
| D406,512 S | 3/1999 | Gardner |
| 5,931,298 A | 8/1999 | Huang |
| 5,931,622 A | 8/1999 | Gupta et al. |
| 5,947,362 A * | 9/1999 | Omli .......................... 227/120 |
| 6,044,972 A | 4/2000 | Rohrmoser et al. |
| 6,082,536 A | 7/2000 | Ito et al. |
| 6,135,278 A | 10/2000 | Rohrmoser et al. |
| 6,250,464 B1 | 6/2001 | Daubinger et al. |
| 6,394,268 B1 | 5/2002 | Dill et al. |
| 6,468,624 B1 | 10/2002 | Fujisawa et al. |
| 6,708,821 B1 | 3/2004 | Tucker et al. |
| 2003/0075466 A1 * | 4/2003 | Herelier et al. ............. 206/338 |

* cited by examiner

FASTENER CARRIER ASSEMBLY AND METHOD OF USE

The invention relates generally to a fastener carrier assembly and method of use for securing fasteners in a workpiece using a driving tool, such as a nail gun. This application claims priority under 35 U.S.C. § 120 as a continuation-in-part of U.S. application Ser. No. 10/321,840, filed Dec. 18, 2002, now abandoned.

BACKGROUND OF THE INVENTION

Fastener carrier assemblies for securing rows of fasteners in a driving tool such as a nail gun are known, as in U.S. Pat. No. 6,394,268. This patent discloses a single strip of interconnected collar members disposed upon a plurality of fasteners within a driving gun. In U.S. Pat. No. 5,931,622, fasteners are maintained in position by a single strip of carrier sleeves that include breakable portions which detach from the fasteners as each fastener is driven into a workpiece. In U.S. Pat. No. 5,069,340, a single strip of fastener sleeves includes an annular portion formed with a breakable portion. The annular portion is intended for being kept with the fastener after it has been driven into a workpiece and the breakable portion is intended for removal from the annular portion after the fastener has been driven into the workpiece.

It would be desirable to have a fastener carrier assembly that includes a first, frangible carrier portion which collates a plurality of fasteners and a second carrier portion that stays with the fastener after it has been driven into a workpiece, but which reliably maintains its structural integrity after the fastener has been driven into a workpiece and/or which may be fashioned in various ways, such as a washer and/or structural damper, without imposing design constraints on the first carrier portion. It would also be desirable to have a carrier assembly that allows one to replace a second part of a carrier strip intended to stay with a fastener with a different second part that is better suited for a particular application, without affecting or causing to replace or re-design a first frangible carrier strip that collates the fasteners. It would further be desirable that such a generally two-piece carrier assembly would be cost-efficient to manufacture and capable of providing all of the collating functions necessary for proper functioning in standard driving tools, but without compromising the aforementioned attributes relating to a two-piece design.

SUMMARY OF THE INVENTION

The above needs are met, and the shortcomings of prior art are overcome by the fastener carrier assembly of the invention. In particular, the invention provides a fastener carrier assembly of the type used to secure rows of fasteners using a driving tool, wherein the fastener carrier assembly includes a first and second carrier portion. The first carrier portion is removed from a fastener as it is being driven into a workpiece and the second carrier portion remains with the embedded fastener.

According to one embodiment, a fastener carrier assembly includes a plurality of drivable fasteners, an upper strip and a plurality of washers which may be interconnected. The upper strips include a plurality of interconnected, frangible collating elements attached in a row. The collating elements and washers are secured to the fastener shanks and spaced from each other such that the collating elements are disposed near the fastener head and the washers are disposed near the fastener tip. The collating elements may be made of the same material, or a different material from the washers, and one or both of the collating elements and washers may have the same widthwise extent as the diameter of the fastener head.

In another embodiment, a carrier assembly adapted for collating fasteners for use with a driving tool includes a plurality of frangible collating elements and sleeves, each pair of which being disposed at respective upper and lower portions of a fastener shank, wherein each sleeve is adapted for being lodged between the respective fastener head and workpiece when the fastener is embedded in the workpiece. The sleeves may correspond to washers having a torus shape, or the sleeves may describe some other geometric body which is generally axially symmetric. The collating elements may have a first cross section that is substantially thinner than a second section, so as to promote fracture of the collating element along a predetermined line. The sleeves may be made from a relatively elastic material, while at the same time the collating elements may be made from a more brittle material.

In another embodiment, a method for securing fasteners to a workpiece includes the steps of providing a fastener carrier assembly including a plurality of securing members and interconnected collating members secured to each fastener, inserting the fastener carrier assembly into a magazine of a driving tool having a firing bore, advancing each of the fasteners into the firing bore, and discharging the driving tool. As each one of the fasteners is driven into the workpiece, the collating element is broken off and fully removed from the fastener. After the collating element has been fully removed from the fastener, the washer advances upwardly along the shank until the fastener has been driven to its final depth in the workpiece.

In another embodiment, a fastener carrier assembly element with fastener received therein includes a first element including a gripping body extending circumferentially about the shank axis and a portion that extends from the gripping body towards the tip, the portion having a length, a second element, separate from the first element, extending circumferentially about the shank axis and disposed between the first element and tip, wherein the first body and second element are spaced by a distance defined approximately by the length of the first element portion.

In another embodiment, two piece fastener carrier element and fastener of a fastener carrier assembly including a fastener including a shank having a circumference, head and tip, the shank including a tapered portion proximal the head and a straight portion between the tapered portion and tip, a first element including a grip body extending about the circumference of the shank at the straight portion, and including a portion extending upward from the grip body and terminating proximal the tapered portion, a second element, separate from the first element, extending about the circumference of the shank at the straight portion.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings:

FIG. 1b is a side view of the fastener assembly of FIG. 1a.

FIG. 2a is a plan view of a portion of an upper carrier strip of the fastener assembly of FIG. 1a.

FIG. 2b is a side view of the upper carrier strip portion of FIG. 2a.

FIG. 3a is a top view of a portion of a lower carrier strip of the fastener assembly of FIG. 1a.

FIG. 3b is a side view of the lower carrier strip portion of FIG. 3a.

FIG. 5b is a side view of a portion of the fastener assembly of FIG. 5a.

FIG. 6a is a plan view of a portion of an upper carrier strip of the fastener assembly of FIG. 5a.

FIG. 6b is a side view of the upper carrier strip portion of FIG. 5a.

FIG. 7b is a side view of a portion of the fastener assembly of FIG. 7a.

FIG. 8a is a plan view of a portion of an upper carrier strip of the fastener assembly of FIG. 7a.

FIG. 8b is a side view of the upper carrier strip portion of FIG. 7a.

DETAILED DESCRIPTION OF THE PREFERRED EMBODIMENTS

Figure 1A:
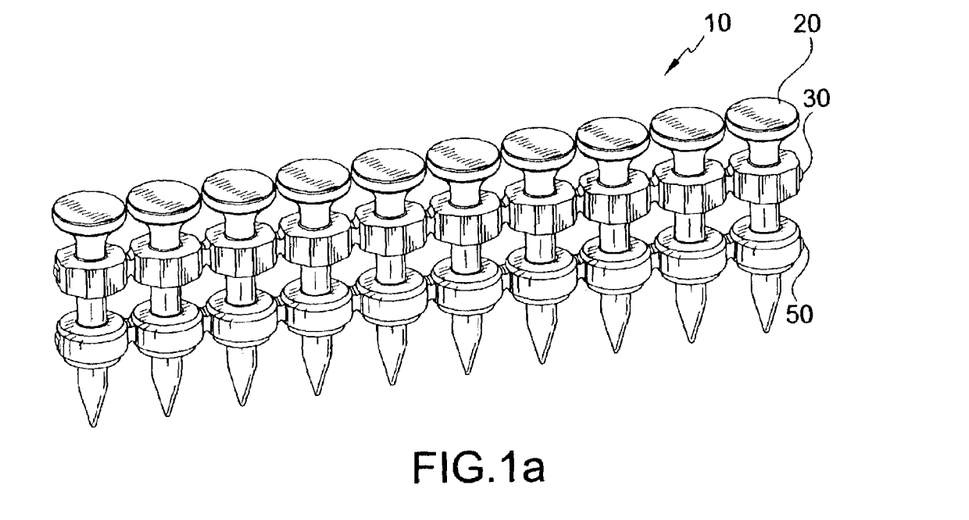
FIG. 1a is an isometric view of one embodiment of a fastener carrier assembly incorporating the principles of the invention.
Figure 1B:
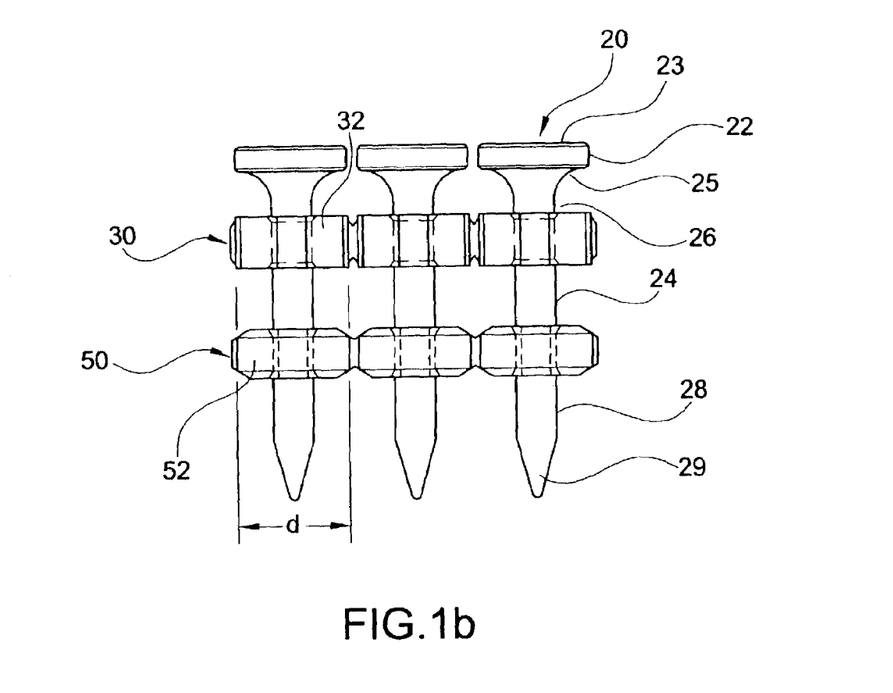

A fastener carrier assembly of the invention includes a plurality of fasteners, an upper carrier portion and a lower carrier portion. A preferred embodiment of the fastener assembly is illustrated in FIGS. 1a–1b. The fasteners, which have drivable heads, e.g., nails or pins, are collated by one or both of the carrier portions so that they may be driven into a workpiece using any conventional pneumatic or combustion powered driving tool. The carrier portions include respective upper and lower sleeves which grip the fasteners at positions along the fasteners' shanks. When located within the driving tool's magazine, the carrier portions promote proper alignment of the fasteners as they are advanced within the magazine, and then positioned within the nose of the driving tool. When in the nose of the driving tool, a fastener is driven into the base material (or workpiece) by the tool's driving mechanism, which will typically both separate the fastener from the row of remaining fasteners and apply a driving force to the fastener head. As the fastener is driven into the base material, the upper sleeve is removed from the shank while the lower sleeve remains with the fastener. Thus, after the fastener has been driven into the workpiece, the lower sleeve remains lodged between the workpiece and head of the fastener.

One example of a fastener assembly incorporating the principles of invention is illustrated in FIGS. 1a–3b. In this embodiment, a fastener carrier assembly 10 includes a plurality of nail-type fasteners 20, collated by two separate upper and lower carrier strips 30 and 50.

Referring to FIGS. 1a and 1b, each fastener 20 includes a drivable head 22 and an elongated shank 24. Shank 24 includes a taper 25 formed at its upper end near head 22 and a pointed tip 29 at its lower end adapted for piercing through a workpiece, such as wood, drywall, metal, concrete or a combination thereof. In the disclosed embodiment, fastener 20 is adapted for being driven into concrete-like material. Fastener head 22 and shank 24 are suitably sized for use in any conventional pneumatic or combustion driving tool, such as the Trakfast driving tool. In the disclosed embodiment, shank 24 is of circular cross-section. Each fastener 20 is made from material of suitable strength, e.g., high strength steel. Strip 30 includes a plurality of upper sleeves 32 connected by upper frangible bridges 34. Sleeves 32 are preferably positioned to grip fasteners 20 at upper portions 26 of their respective shanks 24.

Lower carrier strip 50 is separate and preferably spaced apart from upper strip 30. Strip 50 includes a plurality of lower sleeves 52 which may be interconnected by frangible lower bridges 54. Sleeves 32 are preferably positioned to grip fasteners 20 at lower portions 28 of their respective shanks 24.

Each of sleeves 30 and 50 are preferably manufactured from the same material, e.g., high density polyethylene. Carrier assembly 10 may be assembled by inserting fasteners 20 into preformed strips 30 and 50, or carrier assembly 10 may be assembled by directly molding carrier strips 30 and 50 onto a row of fasteners. In the former case, the holes formed by each sleeve of strips 30 and 50 may be sized for snugly receiving a respective fastener so that inadvertent removal of fasteners 20 from strips 30 and 50 during normal handling activities (e.g., assembly, packaging, and loading) is minimized.

As can be seen in FIG. 1b, each of an upper sleeve 32 and lower sleeve 52 of strips 30 and 50, respectively, may have a lateral extent d that is approximately equal to a diameter of head 22. By sizing the lengths of sleeves 32 and 52 according to head 22 diameter, fastener 20 will tend to maintain proper alignment within the driving bore of the driving tool nose when impacted by the driving mechanism. This is because head 22, sleeve 32, and in particular sleeve 52 will bear against the walls of the bore before any substantial misalignment occurs within the bore. Such a sizing of sleeves according to head 22 diameter may also minimize the extent that one fastener may rotate relative to other fasteners when in a tool's magazine, without a need to stiffen bridges 34 and/or 54 since the ends of adjacent sleeves 52 will abut before fastener 20 rotates a significant amount.

Figure 2A:
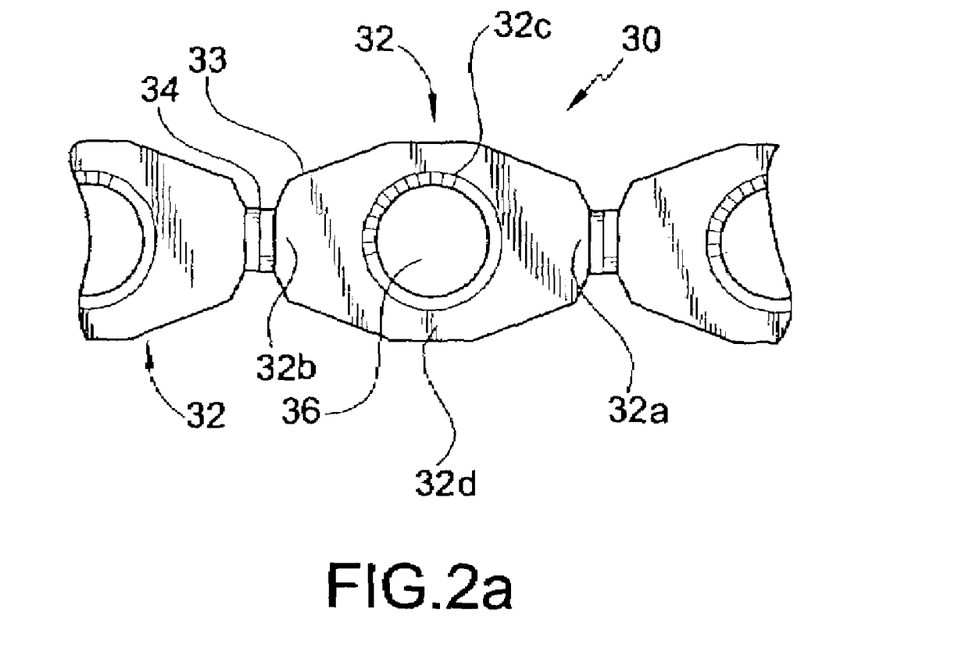
Figure 2B:
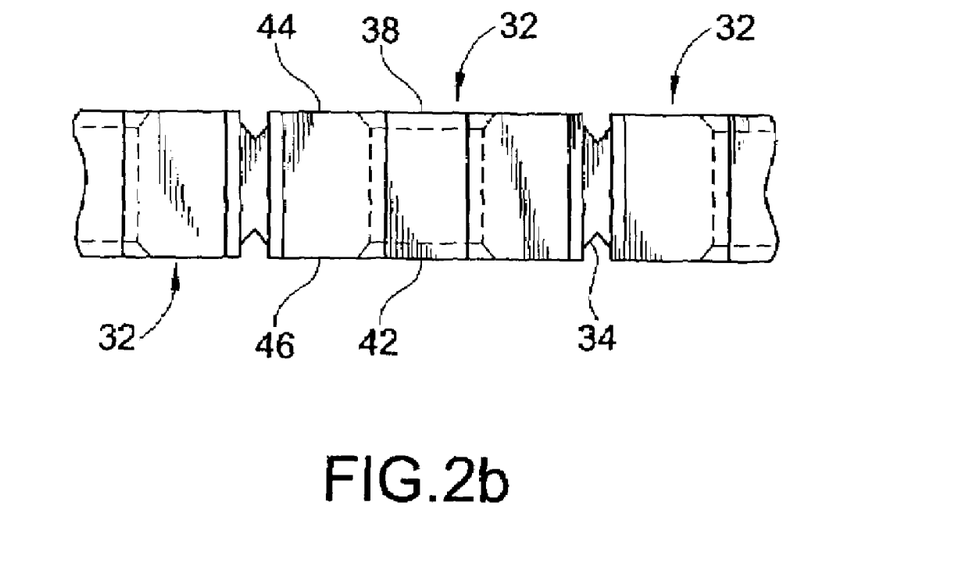

FIGS. 2a and 2b illustrate respective top and side views of upper sleeve 32. Sleeve 32 is formed so as to provide adequate strength for maintaining proper alignment of fasteners 20 as carrier assembly 10 is fed through the magazine of the driving tool, yet is easily breakable and removable from fastener 20 as fastener 20 is driven into a workpiece by the tool's driving mechanism. Upper sleeve 32 may have a polygonal outer surface 33 including straight-edged side portions 32c and 32d, and end portions 32a and 32b to achieve this purpose. A preformed, circular hole 36 extends through sleeve 32 and preferably has a diameter sized to achieve a firm grip of fastener 20 about upper portion 26. Chamfers 38 and 42 may also be formed along one or both of openings 38 and 42 to assist with guiding fasteners into sleeve 32 during assembly of carrier assembly 10.

Side portions 32c and 32d are preferably sized to provide a relatively thin cross-section for sleeve 32, as compared to end portions 32a and 32b. More specifically, the thickness of side portions 32c and 32d, as best illustrated in FIG. 2a, are sufficiently thin so that sleeve 32 will fail at one or both of portions 32c and 32d when fastener 20 is driven into the workpiece. Frangible bridges 34 are formed between adjoining end portions 32a and 32b of sleeves 32 so as to retain sleeves and fasteners in the desired collated fashion. Bridges 34 may be sized to provide sufficient structural support to keep upper sleeves 32 connected during normal handling activities (e.g., assembly, packaging, and loading), but also to permit rapid and easy separation of sleeve 32 from adjoining sleeves during the fastener driving process.

Referring to FIG. 2b, first and second surfaces 44 and 46 of sleeve 32 are preferably substantially flat. However, notches may be formed along the upper surface of side portions 32c and 32d to encourage fracture at pre-designated areas of sleeve 32. As discussed in greater detail below, when fastener 20 is driven into the base material, sleeve 32 will fail at one or both of portions 32c and 32d due to opposed compressive forces of lower sleeve 50 and head 22, and outwardly directed forces exerted on inner walls of hole 36 by taper 25 as sleeve 30 is forced into head 22.

Figure 3A:
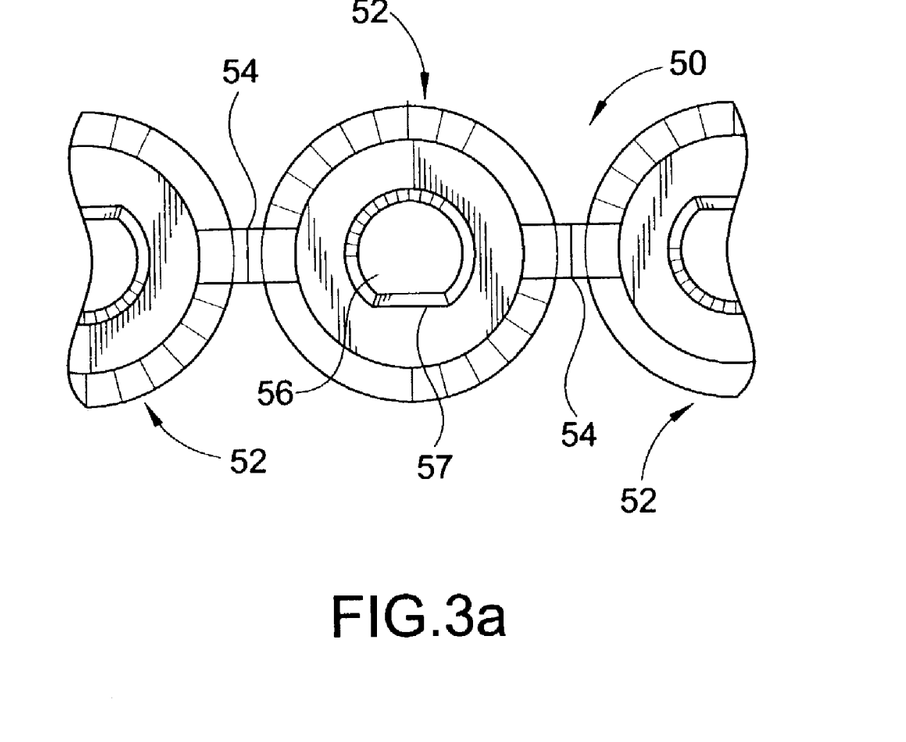
Figure 3B:
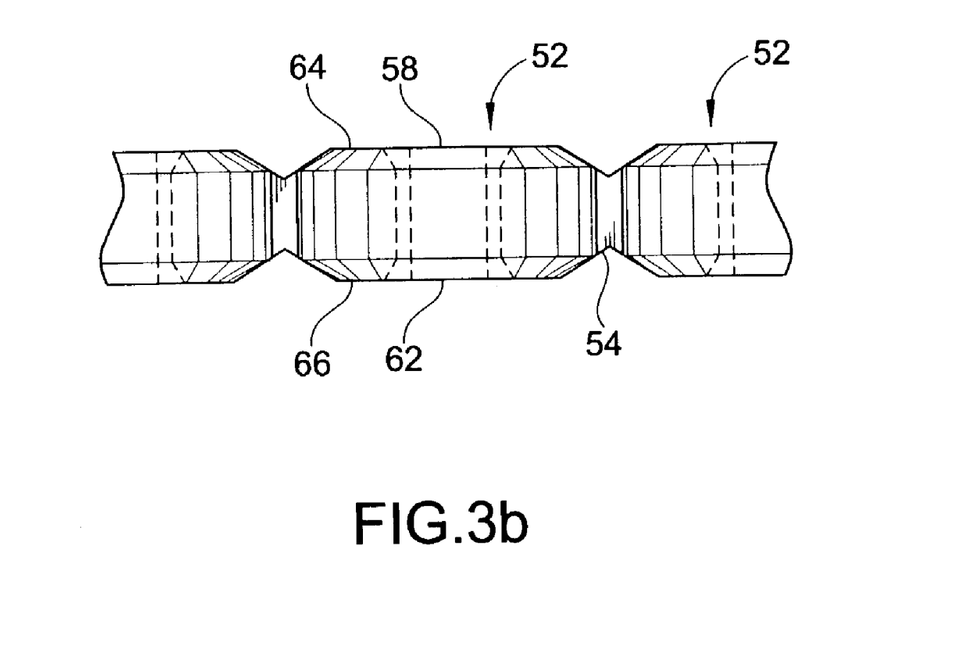

FIGS. 3a and 3b illustrate respective top and side views of lower sleeve 52. Unlike sleeve 32, lower sleeve 52 is intended to remain with fastener 20 after fastener 20 has been driven into the workpiece. In the preferred embodiment, sleeve 52 resembles a torus, but may take on various other shapes, e.g., an elliptical shape in which the major and minor axes are not equal to each other. As mentioned above, the lateral extent of sleeve 52 may approximate the outer diameter d of fastener head 22 to assist with maintaining proper co-axial alignment of fastener in the bore of the driving tool nose, and/or to maintain proper alignment between fasteners 20.

Lower sleeve 52 has a preformed circular-like hole 56, which preferably has a diameter that achieves a firm grip of fastener 20 about lower portion 28 of fastener shank 24 when shank 24 is inserted into hole 56 during assembly. A tighter fit between shank 24 and hole 56 may be achieved by, e.g., forming a boss 68 along a wall of hole 56, thereby increasing the elastic holding forces in sleeve 52 as shank 24 is forced through undersized hole 56. Referring to FIG. 3b, sleeve 52 preferably includes substantially flat upper and lower surfaces 64, 66, circumscribing openings 58, 62 of hole 56. In other embodiments, sleeve 52 may have a protruding flange formed along the upper and/or lower surfaces that is adapted for being flattened out as sleeve 52 is squeezed between head 22 and the workpiece. A protruding flange may be desired for purposes of minimizing movement between a fixture and fastener 20, such as when fastener 20 cannot be fully driven into the workpiece.

Sleeves 52 may be interconnected by frangible bridges 54, as shown. Bridges 34 and 54 may have a comparable length and cross section, and they may be made from the same material. However, it may be desirable to have detached sleeves 52, or sleeves 52 which are connected by bridges 54 having reduced strength properties as compared to bridges 34. Such a need may arise if, e.g., there is concern that the bridge connecting sleeves 52 is not cut at essentially the same time as upper bridge 34, thereby inducing a twisting moment when the fastener is acted upon by the driving mechanism.

Figure 4A:
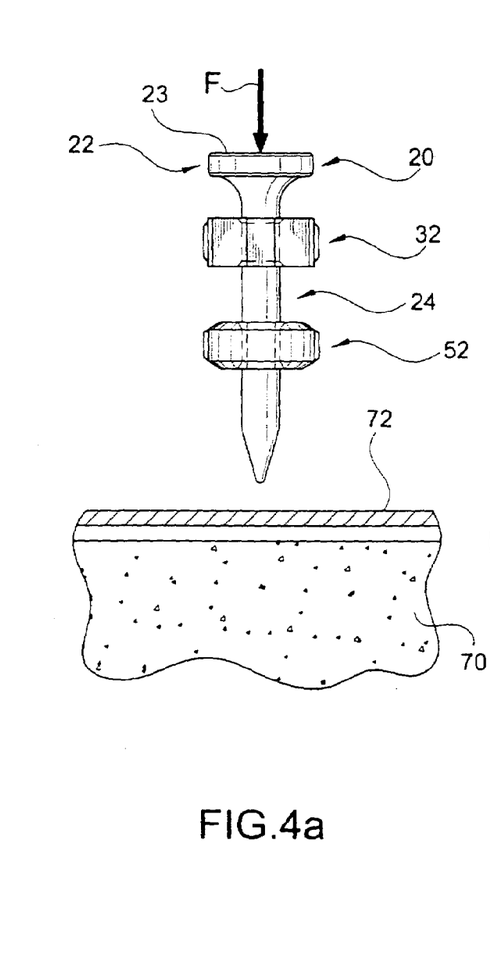
FIGS. 4a through 4c are side views of a representative fastener being driven into a workpiece according to the principles of invention.
Figure 4B:
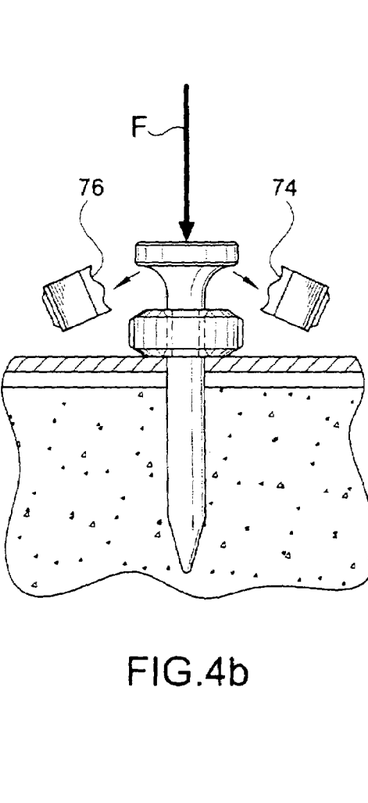
Figure 4C:
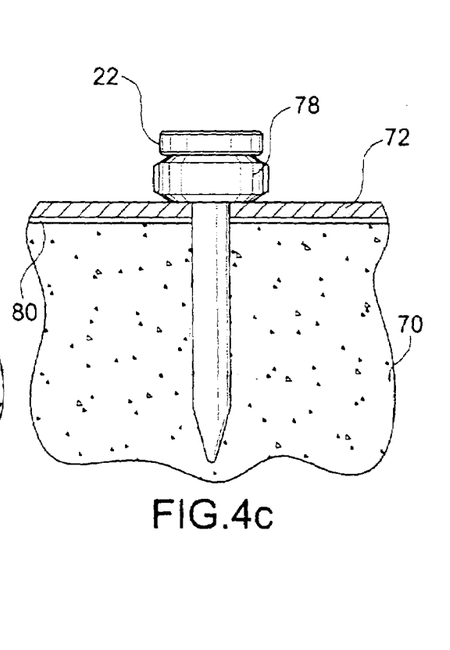

Fasteners 20 may be used to secure fixtures, such as furring strips or channels, to a base material such as a concrete wall. FIGS. 4a, 4b and 4c illustrate the sequence of events from fastener 20 being impacted by the driving mechanism to fastener 20 being embedded into a concrete base material 70 for purposes of retaining, e.g., a metal fixture 72 to the concrete. Referring to FIG. 4a, a blow is applied to head 22 at surface 23 by the driving mechanism (illustrated as externally applied force F). Sleeves 32 and 52 are severed from connecting sleeves, either by the shear stress induced across the bridges by force F, and/or by providing a cutting blade in the driving mechanism which is applied to bridges 34 and 54 simultaneously with F. As mentioned above, sleeve 52 may, or may not be interconnected by a bridge, but it is preferred that sleeve 52 is interconnected by a bridge.

After fastener 20 has begun to penetrate fixture 72 and base 70, sleeve 52 is pushed upwards along shank 24, mates with sleeve 32 and then pushes sleeve 32 into taper 25. Referring to FIG. 4b, as sleeve 32 is forced into contact with taper 25 and head 22, the combined compressive forces of head 20 and sleeve 52, and outwardly directed forces exerted upon sleeve 32 by taper 25 cause sleeve 32 to break off from fastener 20 by failure along one or both of side portions 32c and 32d (as illustrated by sleeve pieces 74 and 76). Lower sleeve 52 is preferably significantly less prone to fracture than upper sleeve 32 since it is intended to stay with fastener 20. At least for this reason, sleeve 52 is preferably shaped to be axially symmetric to minimize stress concentrations that may result during the fastener driving process.

FIG. 4c illustrates a final position of fastener 20. As shown, a compressed or uncompressed sleeve 78 is lodged between head 22 and fixture 72. In some instances, fastener 20 fails to be completely driven into the workpiece, such as where an impervious rock is disposed in the concrete, or a tool simply does not have sufficient driving force to fully drive fastener 20 into the workpiece. In such situations, a gap 80 forms, which allows an undesirable freedom of motion between head 22 and base 70. For example, gap 80 may lead to relatively high airborne and/or mechanical noise transmission as fixture 72 is allowed to vibrate due to the gap, or gap may ultimately lead to fastener 20 being removed from workpiece 70 by repeated vibration of fixture 72. In either case, the presence of sleeve 78 lodged between head 22 and fixture 72 may assist with absorbing the vibration energy transmitted between fastener 20 and fixture 72. As such, sleeve 54 may alternatively be thought of as a dampening structure.

As mentioned above, in the preferred embodiment sleeves 32 and 52 are made from the same material. However, in an alternative embodiment, sleeve 52 maybe made from a more elastic material than sleeve 32. A more elastic sleeve 52 may enhance its dampening function when lodged between a fixture 72 and the fastener head 22. In this sense, the invention provides leeway for such alternative designs, i.e., composite carrier assembly, because the upper and lower strips 30 and 50 are separate pieces. On the one hand, upper sleeve 32, which is intended to be broken away, may be so designed to enhance or improve upon the repeatability of its fracture regions for each fastener 20 when acted upon by the tool's driving mechanism, but without compromising the function of lower sleeve 52, which is intended to stay with fastener 20 and act as a load-bearing component thereof. On the other hand, if it is desired to use a material for sleeve 52 which, e.g., has a higher damping coefficient, such a design may be implemented without affecting the function of sleeve 32.

Figure 5A:
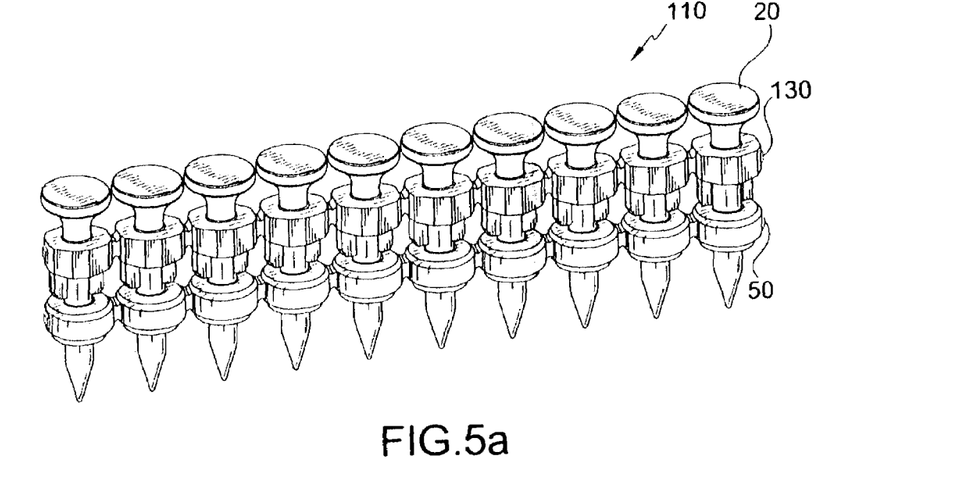
FIG. 5a is a perspective view of a second embodiment of a fastener carrier assembly incorporating the principles of the invention.
Figure 5B:
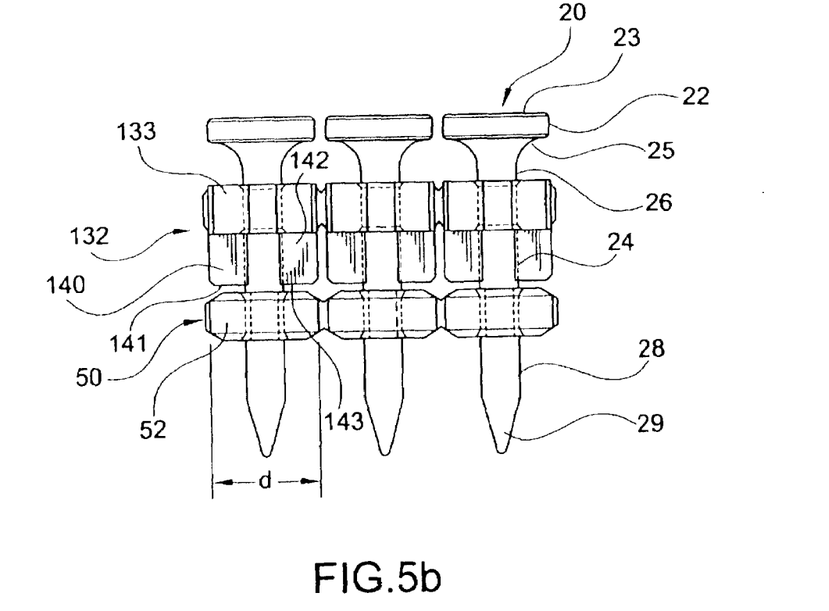

An example of a second embodiment of the invention is illustrated in FIGS. 5a, 5b, 6a and 6b. Referring to FIGS. 5a and 5b, the carrier assembly includes a plurality of nail-type fasteners 20, collated by a lower carrier strip 50 and by an upper carrier strip 130. Carrier strip 50 is preferably the same as carrier strip 50 in the first embodiment, although strip 50 may alternatively be paired with another suitably chosen lower strip, as explained earlier in the first embodiment. Referring to FIG. 5B, strip 130 includes a plurality of sleeves 132, each of which grip a fastener 20 at upper portion 26 of fastener shank 24 via a grip portion 133. In this embodiment, sleeves 132 include longitudinally extending elements 140 and 142, extending downwardly from grip portion 133 and towards sleeve 52 of lower carrier strip 50 such that respective terminal ends 141, 143 of elements 140 and 142 are located in close proximity to sleeves 52. Elements 140, 142 are effective in maintaining the spacing between sleeve 50 and grip portion 133, both during handling of carrier strip 110 and during the loading and firing process by the driving tool. During the handling of strip 110, a proper spacing between strip 130 and 50 may be verified by simply bringing strip 50 into abutting contact with ends 141, 143 before placing strip 110 into a cartridge of a driving tool.

During the firing process, fastener 20 is advanced into, and acted upon by the firing pin of the driving tool. As the pin strikes head 22, bridges 34 and 54 may not simultaneously sever. In these cases, the bridge that has not fractured may still act as a load path resulting in a possibly significant downward pulling force upon the remaining elements of strip 110 as fastener 20 is driven towards the base material by the firing pin. This can result in misalignment of the remainder of assembly 110. For example, in the first embodiment, if bridge 54 were to sever immediately upon impact by the firing pin, but bridge 34 did not, then strip 30 for the remaining fasteners might be pulled towards strip 50 which could affect the proper advancement of subsequent fasteners into the firing bore. It is desirable to have both bridges sever simultaneously, but this is not realistic given the slightly different strength/stiffness characteristics among bridges, tolerances in the firing and/or loading mechanism(s) of the driving tool, etc . . . that are inevitable. If it is preferred to have bridges for both the upper and lower sleeves, as in the preferred embodiments, then it may be desirable to have elements, such as elements 140, 142, extend down from grip portion 133 towards sleeve 52 as in the second embodiment. Elements 140, 142 need not be attached to lower sleeve 52 and grip portion 133. Ends 141, 143 lie adjacent to, or abut lower sleeve 52 to preclude grip portion 133 from advancing any significant amount toward sleeves 52 during the firing process. Thus, where bridges do not sever simultaneously, the spacing between sleeve 52 and grip portion 133 are nevertheless maintained in the remainder of assembly 110. The abutting contact provided by elements 140, 142 will also assist in severing lower bridge 54 should upper bridge 34 sever first by the downward force applied to sleeve 52 through sleeve 132.

Figure 6A:
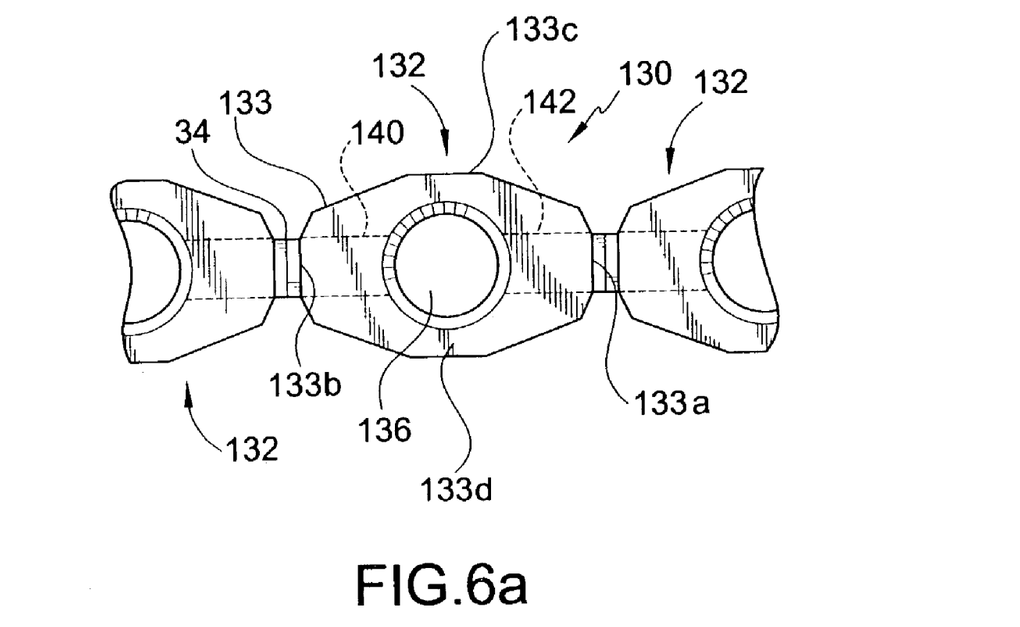
Figure 6B:
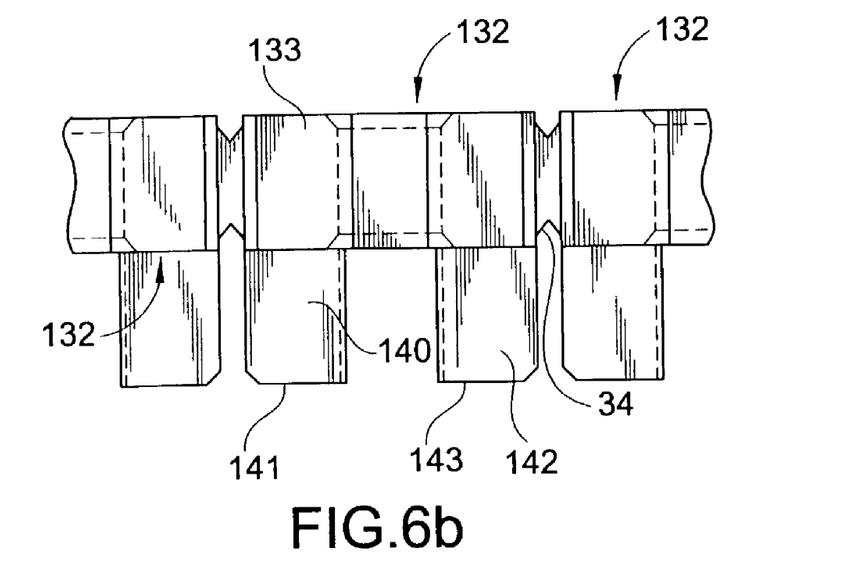
Figure 7A:
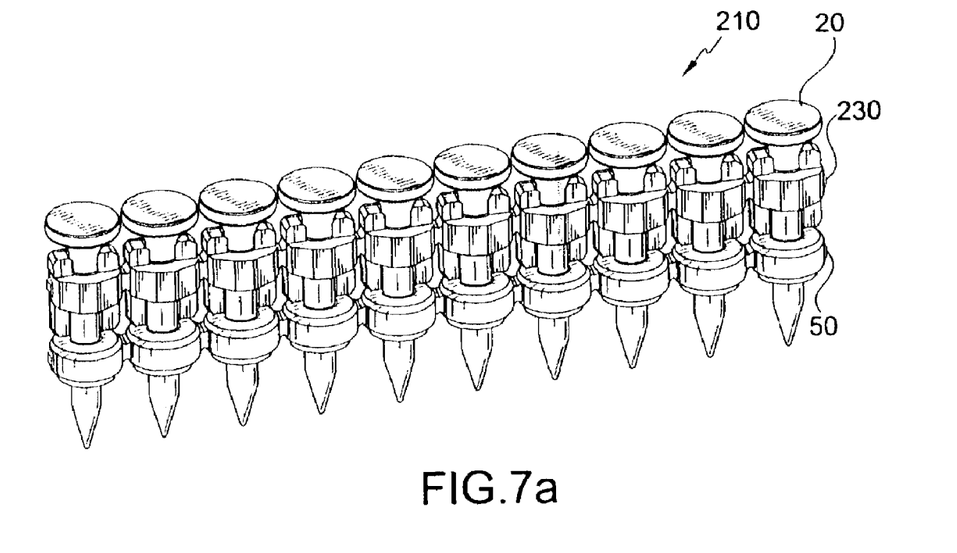
FIG. 7a is a perspective view of a third embodiment of a fastener carrier assembly incorporating the principles of the invention.
Figure 7B:
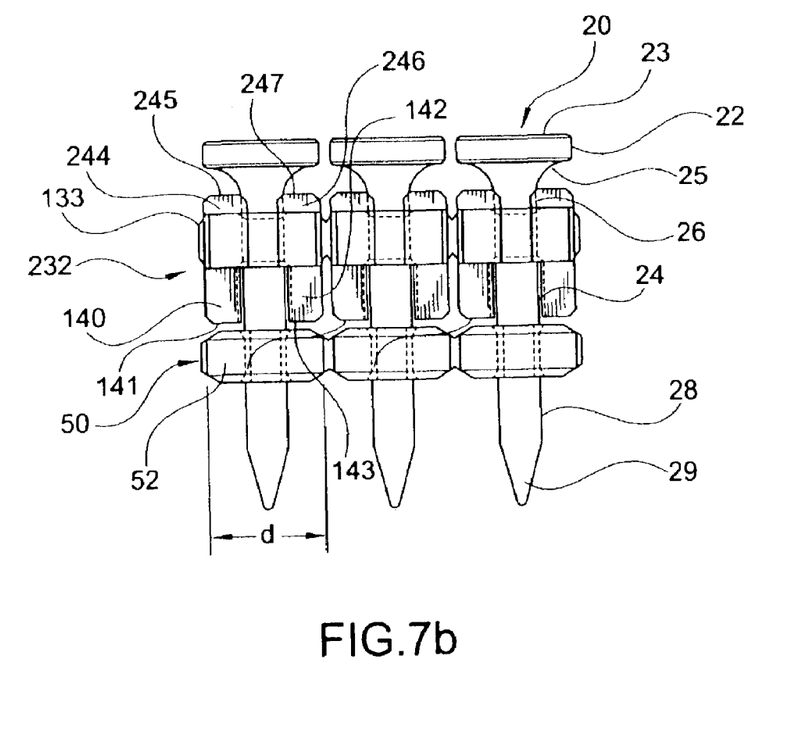

Referring to FIGS. 6a and 6b, grip portion 133 defines a hole 136 for receiving fastener shank 24 at an upper portion 26 thereof, and left and right elements 140, 142 extend downwardly from end portions 133a, 133b. Side portions 133c and 133d are formed with a thinner cross section than end portions 133a, 133b so that grip portion 133 will tend to fracture at one or both of side portions 133c, 133d during the fastener insertion process. The sequence of fracturing and then insertion of fastener 20 into the base material after sleeve 32 has been removed from shank 24, as illustrated in FIGS. 4a through 4c and described previously for the first embodiment, is the same in the second embodiment, but may additionally include the following advantage: ends 141, 143 of elements 140, 142, when disposed in close proximity to or abutting sleeve 52, will assist in separating sleeve 52 from the remainder of the carrier strip.

Elements 140 and 142 may be separately, spaced elements from each other or one-piece. For example, a single element may be formed by an extension of grip portion 133 downward towards sleeve 52. In this embodiment, the single element may be notched in the area below side portions 133c, 133d so that the presence of the element does not impede the severing of grip portion 133 during the insertion process. Elements 140, 142 are generally elongate and may have a thin cross section or may have a cross section approximating the cross section of ends 133a, 133b.

Referring to FIGS. 7a, 7b, 8a and 8b, an example of a third embodiment of the invention is illustrated. In this embodiment, all features of a carrier fastener assembly are the same as in the second embodiment, with the exception that strip 130 is replaced with strip 230, including sleeves 232 with elements 244 and 246 that extend upwardly from each of the grip portions 133. In this embodiment of an upper carrier strip, elements 244 and 246 may be included with or without lower extensions 140 and 142. Ends 245, 247 of elements 244, 246 disposed between sleeve 232 and head 22 may be desirable as a means for maintaining a spacing between head 20 and sleeve 232, in other words, to keep sleeve 232 from sliding up towards head 22. One example of where this function may be useful would be during the firing process. As a fastener 20 is advanced into the firing bore and acted upon by the firing pin, the resultant loads applied to the remainder of the carrier strip (through bridge(s) which have not yet severed) may cause the shank to slide downward in the upper strip, thereby possibly misaligning the remaining fasteners within the cartridge. By providing upper elements 244, 246, shank 24 is discouraged from sliding any significant amount. Additionally, it may be desirable to include elements 244, 246 in the strip 30 or 130 so as to induce a higher magnitude bending stress in the targeted grip portion 133 fracture region, i.e., side portions 133d, 133c or 32d, 32c. This can be easily appreciated by noting that the tensile stress induced in sides 133d and 133c, resulting from the downward pressure acting through head 22 and/or taper 25, will increase as the moment arm increases. Thus, by providing elements 244, 246, the moment arm, defined generally by the distance from ends 245 or 247 to the center of ends 133d, 133c will facilitate a more rapid fracture of grip portion 133 during fastener insertion.

Figure 8A:
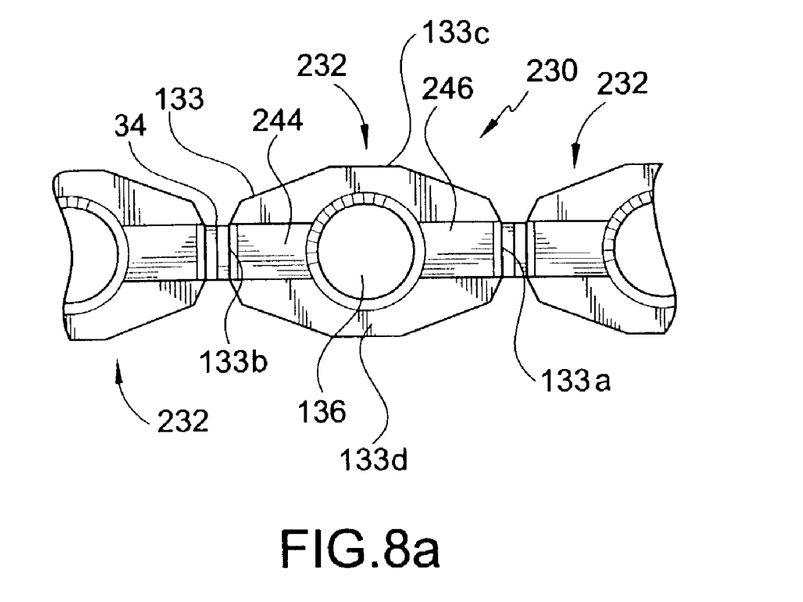
Figure 8B:
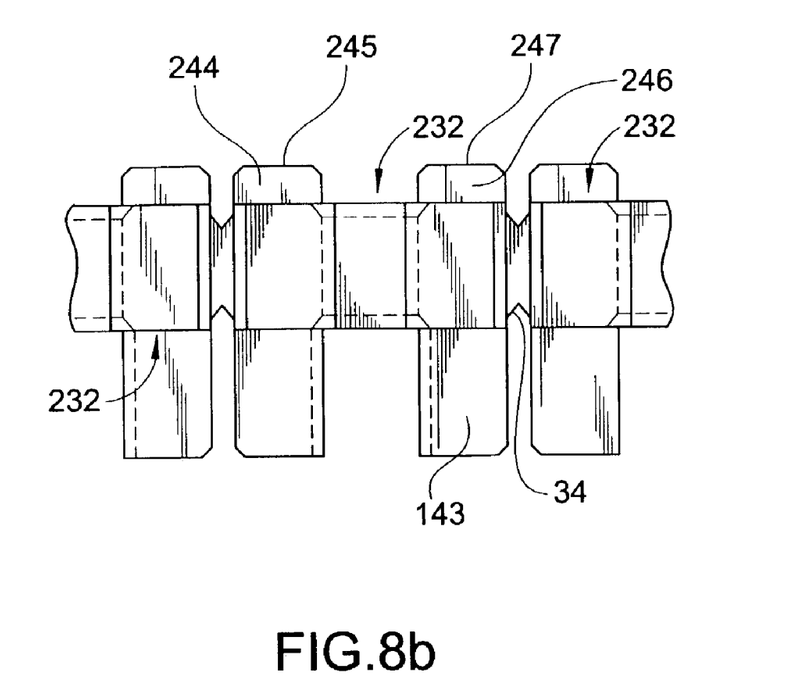

Referring to FIGS. 8a and 8b, elements 244 and 246 preferably extend upward from end portions 133a, 133b so that elements 140, 244 and 142, 246 are respectively aligned with each other. Elements 244, 246 may alternatively be replaced by a single, unitary piece extending upward from gripping portion 133 with a notch formed at a location above side portions 133c, 133d.

Although the foregoing description is directed to the preferred embodiments of the invention, it is noted that other variations and modifications will be apparent to those skilled in the art, and may be made without departing from the spirit or scope of the invention.

What is claimed is:

1. A two-piece carrier assembly adapted for holding a plurality of fasteners driven into a workpiece by a driving tool, wherein each of the fasteners include a drivable head and an elongated shank terminating at a tip, the shank having a longitudinal axis that is perpendicular to a workpiece plane, the two-piece carrier assembly comprising:
an upper strip including a plurality of interconnected, frangible collating elements having a first and second thickness in the workpiece plane, each collating element connected to a respective shank of a fastener at a location proximal the head, each collating element connected to another collating element via an upper frangible bridge, each collating element adapted to completely break away from the respective fastener shank leaving no remnants when the fastener is driven into the workpiece;
a plurality of longitudinally-extending spacer elements each connected only to a respective collating element and extending towards a respective lower sleeve, and
a lower strip including a plurality of flat-topped sleeves each connected to another sleeve via a lower frangible bridge, each sleeve connected to a respective shank at a location proximal the tip, and adapted for being lodged between the respective fastener head and workpiece when the fastener is fully embedded in the workpiece,
wherein the spacer element contacts the flat top of the sleeve and severs the lower bridge essentially simultaneously with the upper bridge when the fastener is driven into the workpiece.

2. The carrier assembly of claim 1, wherein each of the sleeves describe a first, symmetric shape when viewed in the workpiece plane and each of the collating elements describe a second, asymmetric shape when viewed in the workpiece plane.

3. The carrier assembly of claim 1, wherein each sleeve is a torus.

4. The carrier assembly of claim 1, wherein the spacer element has a quadrilateral cross-sectional shape.

5. The carrier assembly of claim 4, wherein the spacer element comprises a first and second spacer element.

6. A fastener carrier assembly element with fastener received therein, the fastener having a shank defining a longitudinal axis, a tip and a head, the fastener carrier assembly element comprising:
a first element including a gripping body extending circumferentially about the shank axis and a longitudinally-extending spacer portion that extends from the gripping body towards the tip, the spacer portion having a length, the first element including at least one frangible upper bridge connected to another first element;
a second element, separate from the first element, extending circumferentially about the shank axis and disposed between the first element and tip, the second element having a flat top and including at least one frangible lower bridge connected to another second element;
wherein the spacer portion contacts the flat top of the second element and severs the lower bridge essentially simultaneously with the upper bridge when the fastener is driven into the workpiece;
wherein the first element and spacer portion are adapted to sever from the fastener completely when the fastener is driven into a workpiece, the second element remaining between the fastener head and workpiece after the fastener is imbedded in the workpiece.

7. The fastener element of claim 6, wherein the spacer portion includes first and second portions.

8. The fastener element of claim 6, wherein the gripping body includes first and second sides having a first cross-sectional thickness, and third and fourth sides having a second cross-sectional thickness.

9. The fastener element of claim 8, wherein the portion includes first and second longitudinal extensions that extend downwardly from the respective third and fourth sides.

10. The fastener element of claim 8, wherein the first and second sides define first and second fracture points for facilitating fracture of the gripping body as the fastener is impacted by a firing pin.

11. The fastener element of claim 10, wherein the fracture points are substantially devoid of the spacer portion below the fracture points.

12. The fastener element of claim 11, wherein the spacer portion comprises first and second spacer portions.

13. A fastener carrier assembly for use in a driving tool, the assembly comprising:
a plurality of fasteners and a carrier for collating the fasteners, the fasteners having a head and a shank defining a longitudinally-extending shank axis;
the carrier including a plurality of frangible collating elements, each frangible collating element including:
an upper sleeve surrounding the shank and adapted for being broken away completely from the shank when the fastener is driven into a workpiece by a driving tool, the upper sleeve connected to at least one other upper sleeve by an upper frangible bridge; and a lower sleeve separate from the upper sleeve and surrounding the shank, the lower sleeve connected to at least one other lower sleeve by a lower frangible bridge, the lower sleeve having a flat top and adapted for being lodged between the fastener head and the workpiece when the fastener is driven into the workpiece; and
a longitudinally-extending spacer element connected only each upper sleeve and extending towards the lower sleeve, wherein the spacer element contacts the flat top of the lower sleeve and severs the lower bridge essentially simultaneously with the upper bridge when the fastener is driven into the workpiece.

14. The carrier fastener assembly of claim 13, wherein the spacer element comprises left and right longitudinally extending members, each of which having planar front and back surfaces.

15. The carrier fastener assembly of claim 14, wherein the lower sleeve has a flat, upper surface that is everywhere at right angles to the front and back surfaces of the left and right members, and the left and right members each have a thin cross-section as compared to the lower sleeve cross-section.

16. The carrier fastener assembly of claim 14, wherein the left and right members are rectangular and have a thin cross-section as compared to the cross-section of the lower sleeve, when each are viewed in the same plane.

17. The carrier fastener assembly of claim 13, wherein the carrier is a two-piece carrier.

18. The carrier fastener assembly of claim 13, wherein the upper sleeve is a grip portion.

19. The carrier fastener assembly of claim 13, wherein the upper sleeve has a flat upper and lower surface and forms a circular passageway extending between the upper and lower surface, and the length of the passageway, as measured along the shank axis, is equal to the maximum length of the upper sleeve.

20. The carrier fastener assembly of claim 19, wherein the spacer element comprises left and right longitudinally extending members, each of which having planar front and rear surfaces.

21. The carrier fastener assembly of claim 20, wherein the left and right members front and rear planar surfaces extend from the upper sleeve lower surface.

22. The carrier fastener assembly of claim 20, wherein the left and right members front and rear planar surfaces extend between the upper sleeve lower surface and an upper surface of the lower sleeve, wherein the lower sleeve upper surface is everywhere at right angles the front and rear surfaces of the left and right members.

23. The carrier fastener assembly of claim 20, wherein the left and right members are rectangular and have a thin cross-section as compared to the cross-section of the lower sleeve, when each are viewed in the same plane.

24. The carrier fastener assembly of claim 23, wherein the left member has a right inner side facing the shank and a left outer side facing an adjoining collating element, the right member has a left inner side facing the shank and a right outer side facing an adjoining collating element, and the inner and outer sides extend parallel to the shank axis over substantially their entire length.

25. The carrier fastener assembly of claim 13, wherein a taper is formed below the fastener head to facilitate fracture of the upper sleeve when the nail is driven into a workpiece by the driving tool.

26. The carrier fastener assembly of claim 13, wherein the lower sleeve has a uniform cross section that is substantially greater than the cross section of spacer and at least a portion of the cross-section of the upper sleeve.

27. The carrier fastener assembly of claim 13, wherein the lower sleeve has a flat lower surface that is adapted for being placed flush against the workpiece plane when the fastener is driven into the workpiece.

28. The carrier fastener assembly of claim 27, wherein the lower sleeve has a cylindrical outer surface defined by a diameter that is approximately equal to the lateral extent of the nail head.

29. The carrier fastener assembly of claim 28, wherein the lower sleeve includes a chamfered edge formed between the lower surface and the outer cylindrical surface.

30. The carrier fastener assembly of claim 27, wherein when viewed in a plane that is perpendicular to the shank axis, the depth of the upper sleeve, measured from front to back, is less than the lateral extent of the nail head.

31. A method for driving a fastener into a workpiece using a driving tool, comprising the steps of:

loading a plurality of fasteners and a carrier for collating the fasteners into the driving tool, wherein each fastener has a head and a shank defining a shank axis and the carrier includes a plurality of frangible collating elements, each frangible collating element including an upper sleeve, a lower flat-topped sleeve, and a longitudinally-extending spacer element attached to only the upper sleeve and having a planar front surface that extends towards the lower sleeve of the collating element, each upper sleeve connected to another upper sleeve via an upper frangible bridge and each lower sleeve connected to another lower sleeve via a lower frangible bridge;

driving a fastener towards the workpiece with the driving tool, contacting the flat top of the lower sleeve with longitudinally-extending spacer element;

severing essentially simultaneously the upper and lower bridge;

separating the upper sleeve with attached spacer element completely from the shank; and lodging the lower sleeve between the fastener head and workpiece such that the lower sleeve lies flush against the workpiece.

\* \* \* \* \*